(12) United States Patent
Wen et al.

(10) Patent No.: US 6,612,842 B2
(45) Date of Patent: Sep. 2, 2003

(54) SYSTEM AND METHOD FOR INTERACTIVE GIVING TUTORIAL INFORMATION

(75) Inventors: Sayling Wen, Taipei (TW); Harley Fu, Beiging (CN); Yeats Gu, Beiging (CN); Zechary Chang, Taipei (TW)

(73) Assignee: Inventee Corporation, Taipei (TW)

( * ) Notice: Subject to any disclaimer, the term of this patent is extended or adjusted under 35 U.S.C. 154(b) by 0 days.

(21) Appl. No.: 09/901,614

(22) Filed: Jul. 11, 2001

(65) Prior Publication Data

US 2002/0031751 A1 Mar. 14, 2002

(30) Foreign Application Priority Data

Jul. 28, 2000 (TW) .......................................... 89115191

(51) Int. Cl.⁷ ............................. G09B 19/00; G09B 7/00
(52) U.S. Cl. ........................ 434/118; 434/323; 434/362; 434/350
(58) Field of Search ............................... 434/118, 323, 434/322, 362, 350, 307 R, 236

(56) References Cited

U.S. PATENT DOCUMENTS 6,039,575 A * 3/2000 L'Allier et al. ............. 434/118
6,190,178 B1 * 2/2001 Oh ............................... 434/322
6,330,426 B2 * 12/2001 Brown et al. ................ 434/118
6,347,943 B1 * 2/2002 Fields et al. ................ 434/118

* cited by examiner

Primary Examiner—Chen Wen Jiang
(74) Attorney, Agent, or Firm—Troxell Law Office PLLC

(57) ABSTRACT

An interactive tutorial system with operating method being capable of mounting in a web server is disclosed. When commands input in clients by customers are transferred to the web server for interpreting, assignments such as tutorial interfaces, courses, review intervals, or even examination questions are then provided by the server according to the commands. The disclosed system and method permits customers to get into a custom-made or a review mode for design/assign and review, respectively. The customers may assign tutorial interfaces, courses, and review intervals in the custom-made mode and study courses or receive testing via examination questions according to previous determinations in the review mode. Additionally, when customers next time enter the disclosed system, the tutorial interfaces previously assigned will be shown for tutorial purpose. The examination questions may be selected according to answers of the examination questions and the decay model illustrative of the human memory, therefore the disclosed system may real-time selected examination questions suitable for customers' learning conditions for upgrading learning efficiency.

30 Claims, 8 Drawing Sheets

SYSTEM AND METHOD FOR INTERACTIVE GIVING TUTORIAL INFORMATION

BACKGROUND OF THE INVENTION

1. Field of the Invention

The present invention relates to a system and method for giving tutorial information interactively, and more particularly, to a system and method that permit users to define tutorial information such as user interfaces and courses for learning according to their requirements through an information exchange network such as the Internet.

The present also relates to a system and method for periodically providing examinations assigned and defined by users beforehand to upgrade learning efficiency.

The present invention still relates to a system and method for individually displaying tutorial interfaces defined by users beforehand.

Furthermore, the present invention relates to a system and method for periodically providing examinations according to the customers' practical learning conditions and in accordance with a decay model illustrative of the human memory so that a tutorial monitor mechanism in the Internet can be easily established.

2. Description of the Prior Art

The advancement of the computer hardware and software and the highly development of the communication network brings the modern world to have variations everyday. Because information exchanges more frequently than before, a variety of information coded with different data types is generated and transferred each day for achieving different requirements. Because of a variety of services and information being provided through networks, except electric-commerce which has been broadly discussed and carried out recently, some services associated with human's daily works from automated tell machines (ATM) or remote tutorial or educational systems appear continually. People can easily download desire information only by searching web servers or pages through portal sites and then by connecting their computer with web servers around the world through the Internet.

For those people who wish to learn or take lessons from the Internet can employ PCs, notebooks, or workstations to connect with associated web servers for downloading tutorial information. Nevertheless, all the conventional tutorial web servers usually offer tutorial information unidirectionally, and users can not define courses they want to learn. Conventional tutorial web servers only inflexibly offer unfriendly user interfaces, therefore users can only select desired courses or examinations after inputting passwords. It is impossible for customers to define or assign courses from the tutorial web servers, and the web servers can not automatically provide the examinations associated with those lessons already learned for customers. However, it is still impossible for the conventional tutorial web severs to individually build ambiences for customers to take lessons therein. Learning efficiency will be imperceptibly degraded because customers are not encouraged by such non-interactive tutorial systems.

SUMMARY OF THE INVENTION

The principal object of the invention is the provision of a system and a method for upgrading learning efficiency that permit users to define the tutorial interfaces and courses according to their requirements.

The other object of the invention is the provision of a system and a method that periodically provide examinations assigned by users for review.

A further object of the invention is the provision of a system and a method that offers mechanism for customers to define personal tutorial ambiences that can be displayed when users start to learn in the future.

A still further object of the invention is the provision of a system and method for regularly reappearing examinations which users are unfamiliar from learning therefore to establish a tutorial monitor mechanism in the Internet.

According to the above objects, the disclosed system basically encompasses at least one client and a server wherein all clients couple with a server through a communication link, for example, an information exchange network such as the Internet. Commands inputted by users are transferred from clients to server through the information exchange network. The commands are then interpreted to drive the server to offer operating interfaces for customers to perform the operations of defining tutorial interfaces, courses, review intervals, or to offer courses or examinations for reviewal or examining purposes. Storage device include in the server stores programs operated by a server processor to perform the operations of receiving and interpreting commands, accessing tutorial interfaces, courses, and examinations from a tutorial database, generating web pages according to the accessed information, transferring the web pages to clients, and redirecting query requests to associated web sites. The clients encompasses a storage device for storing programs operated by client processors to perform operations of inputting commands and transferring the commands to server, receiving operation interfaces from server for defining courses, examinations and review interval, or storing data of the clients.

The disclosed method displays the user interfaces defined beforehand for entering a definition mode or a review mode when users complete their registry procedure. Users may define user interfaces, courses, and review intervals in the custom-made mode and start to examine by using the examinations that provided according to defined review intervals and in accordance with users' learning conditions and a decay model illustrative of the human memory. Examinations adapted to individual user may be given for effectively upgrading learning efficiency.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
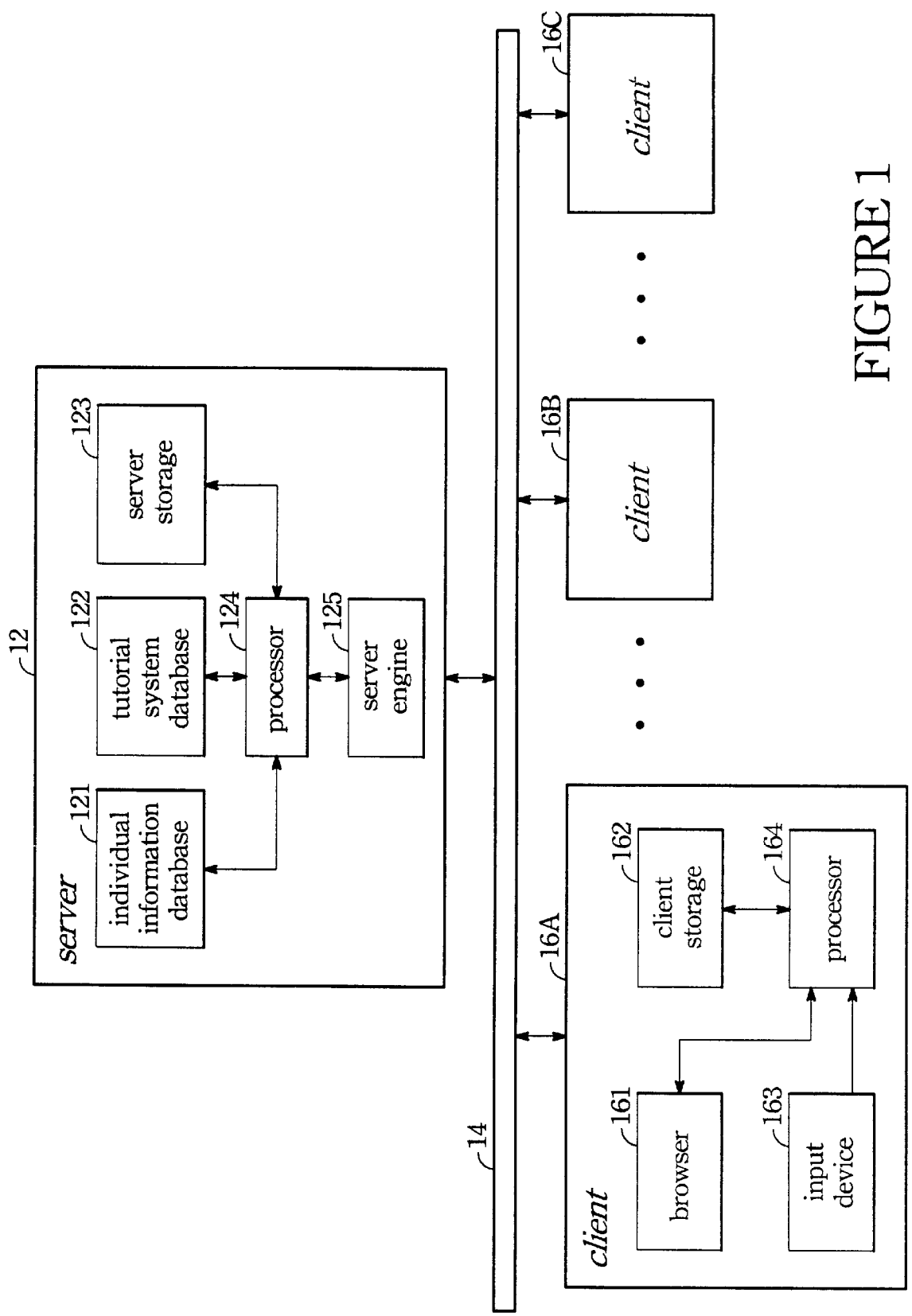
FIG. 1 is a schematic diagram of the preferred embodiment according to the present invention.

Please now refer to FIG. 1, a schematic diagram illustrative of the configuration of the preferred embodiment is disclosed, wherein a server 12 and a plurality of clients 1 6A, 1 6B, 160 are coupled together through a communication link 14. The server 12 is the place where the disclosed interactive tutorial system is mounted, and customers in clients 16A, 16B, or 160 can enter the interactive tutorial system via the communication link 14. Any kind of information exchange network, such as LAN, WAN, the Internet, or wireless communication network, can be employed to be portions of the communication link 14 in the embodiment. Because the detailed configurations of the clients 16A, 16B, and 160 are the same as each other, the following paragraphs give more descriptions for detailed configurations of the server 12 and client 16A in FIG. 1.

Server 12 basically encompasses an individual information database 121, a tutorial system database 122, a server storage device 123, a processor 124, and a server engine 125, wherein the processor 124 couples with the individual information database 121, tutorial system database 122, server storage device 123, and the server engine 125, respectively. The aforementioned individual information database 121 stores all personal information associated with individual customers, such as identification and password, or courses, tutorial GUI (Graphic User Interface), learning conditions, and review interval designed by individual customer. The tutorial system database 122 includes operating interfaces of the interactive tutorial system, courses and in accompanied with detailed contents and examination questions for reviewal purpose. The server storage device 123 stores programs for the processor 124 that the processor 124 operates the programs to perform the operations of receiving command from the communication link 14, interpreting commands, accessing the operating interfaces, course information, or examination questions from the tutorial system database 122, generating web pages according to the course information or examinations, transferring the web pages to client 16, or redirecting customers' query requests to associated web servers. Please note that the skilled persons may modify the total number or contents of the commands as applications. The server engine 125 provides web services for the interactive tutorial system, for example, interpreting or integrating packets from the communication link 14, encapsulating the tutorial interfaces, course information, examinations, as packets, and transferring those web pages to clients 16A.

Moreover, client 16A basically includes a browser 161, a client storage device 162, an input device 163, and a processor 164, wherein the processor 164 also respectively couples with the browser 161, the client storage device 162 and the input device 163. The interactive tutorial system displays tutorial interfaces via the display device of the client 16A. Customer in client 16A therefore may input commands to design his/her personal tutorial ambience including tutorial interfaces, courses, or review interval through the interfaces provided by the disclosed systems and now shown on the display device. Additionally, the client storage device 162 stores programs for the processor 164 that the processor 164 operates the programs to perform the operations of receiving commands from user, transferring commands to the server 12, receiving tutorial courses in accompanied with contents, interfaces, or review information. The client storage device 164 also stores operating data of the client 16A as conventional.

The aforementioned clients 16A, 16B, 16C and server 12 may be establishes by using the conventional client/server or multi-tiers configuration. On the other hand, the data-binding technology may be employed to configure the data transference mechanism between the clients 16a, 16B, 16C and server 12 to effectively upgrade query performance. Therefore the data and objects required for the data-binding approach may be stored in the client storage device 162. Additionally, the input device may include any kind of user interface such as mouse or keyboards for inputting commands. The individual database 121 and the tutorial system database 122 may be independent or combined databases and all conventional database systems such as relational databases (SQL, Sybase, or Oracle) or object-oriented DBMS can be employed to construct the above databases. Furthermore, the processors 124 and 164 can be the CPUs or microprocessors of the computer systems and the server storage device 123 and the client storage device 1623 may be hard disks of computers. All the persons skilled in the art may modify the embodiment as applications but all the modifications within the spirit of the invention should be included in the appended claims.

Figure 2:
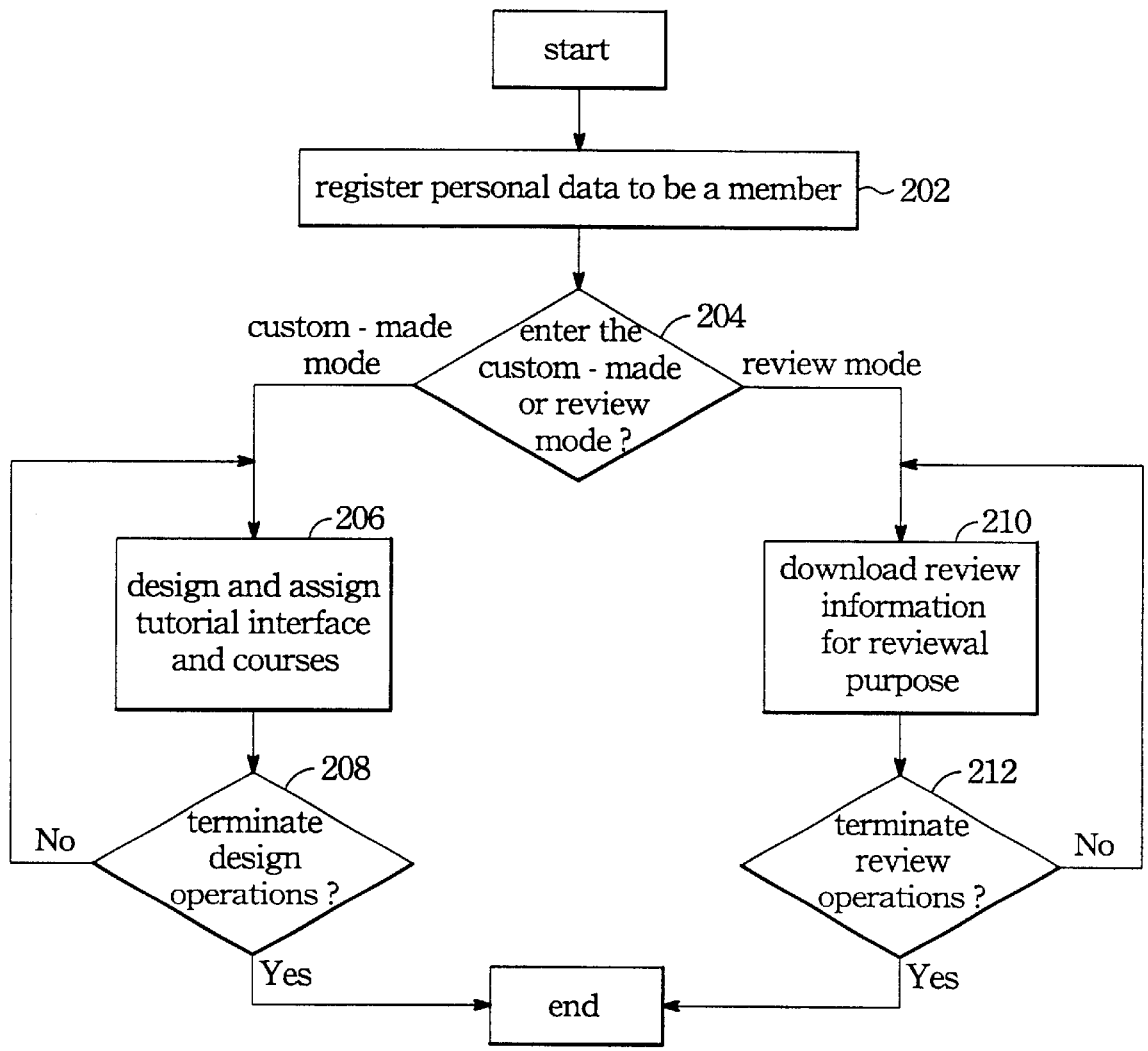
FIG. 2 is a flow diagram illustrative of the operating flow of the preferred embodiment.

Please now refer to FIG. 2, a flow diagram illustrative of the operating flow of the embodiment is shown therein. Firstly, when customer enters the server 12 mounted with the interactive tutorial system, he/she may input his/her identification, password, e-mail address and then register to be a member, or input his/her identification and password to enter the interactive tutorial system (block 202). Next, the customer may enter the custom-made mode to design or assign tutorial interfaces and course contents, or download review information for reviewal purpose in the reviewal mode (block 204). An operating interface provided by the interactive tutorial system is then shown for assigning after customer enters the custom-made mode (block 206). Whole the flow terminates after customer completes the above assign procedure (block 208). On the other hand, customer may review all the already learned courses displayed such as taking examinations via the operating interfaces when customer enters the review mode (block 210) and whole the flow also terminates after customer completes reviewal procedure (block 212). As noted, next time when user enter the interactive tutorial system again, the previously designed tutorial interface will be shown as the individual tutorial ambience in block 204. Any customer may therefore design the tutorial interface adapted to his/her requirements, which also eliminates the disadvantage of providing the unique user interface for every person or member. The following paragraphs give more explanations to the detailed operations of the blocks 206 and 210 by using FIGS. 3 and 4.

Figure 3:
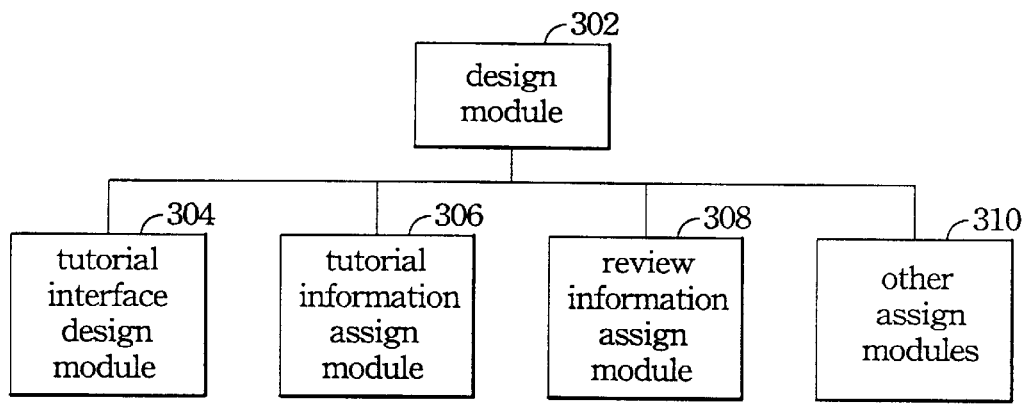
FIG. 3 is a schematic diagram of the software modules according to the invention.

FIG. 3 is a flow diagram illustrative of the software modules of designing the tutorial interface, course contents and review intervals in block 206 wherein the software module is basically composed of an assigning module 302 that provides various operating interfaces for assigning or designing usage. The assigning module 302 further encompasses a tutorial interface design module 304, a tutorial information assign module 306, a review information assign module 308, and an other assign module 310. The tutorial interface design module 304 provides operating interfaces for the customers to design or define foreground color, background color, font types, or font sizes used in his/her own tutorial interfaces. The tutorial information assign module 306 provides the operating interfaces for customers to assign all the desire courses for learning. The review information assign module 308 provides the operating interfaces for customers to assign the review time or interval that the interactive tutorial system should automatically provide review information for customers. Additionally, the other assign module 310 may include else modules having no relationship with the interactive tutorial system such as redirecting to another associated web sites or game module used for taking a rest when breaking from tutorial. However, modules included in the other assign module 310 may be optional modules for mounting in the disclosed system as applications.

As noted, the skilled persons may modify the aforementioned interfaces as applications. For example, the disclosed system may show associated operating interfaces and in accompanied with proper entrances for notifying customers to continue the assign or design procedures via the aids of the assigning module 302. For example, the operating interfaces may contain buttons having prompt tips "assign tutorial interfaces" to notify customers to press the button to assign tutorial interface by activating the tutorial interface assign module 304. It is obvious that the above software modules may provide proper entrances or buttons for performing the assigning procedures, however, all the modifications and similar arrangements included within the spirit of the invention should be included in the scope of the appended claims.

Figure 4:
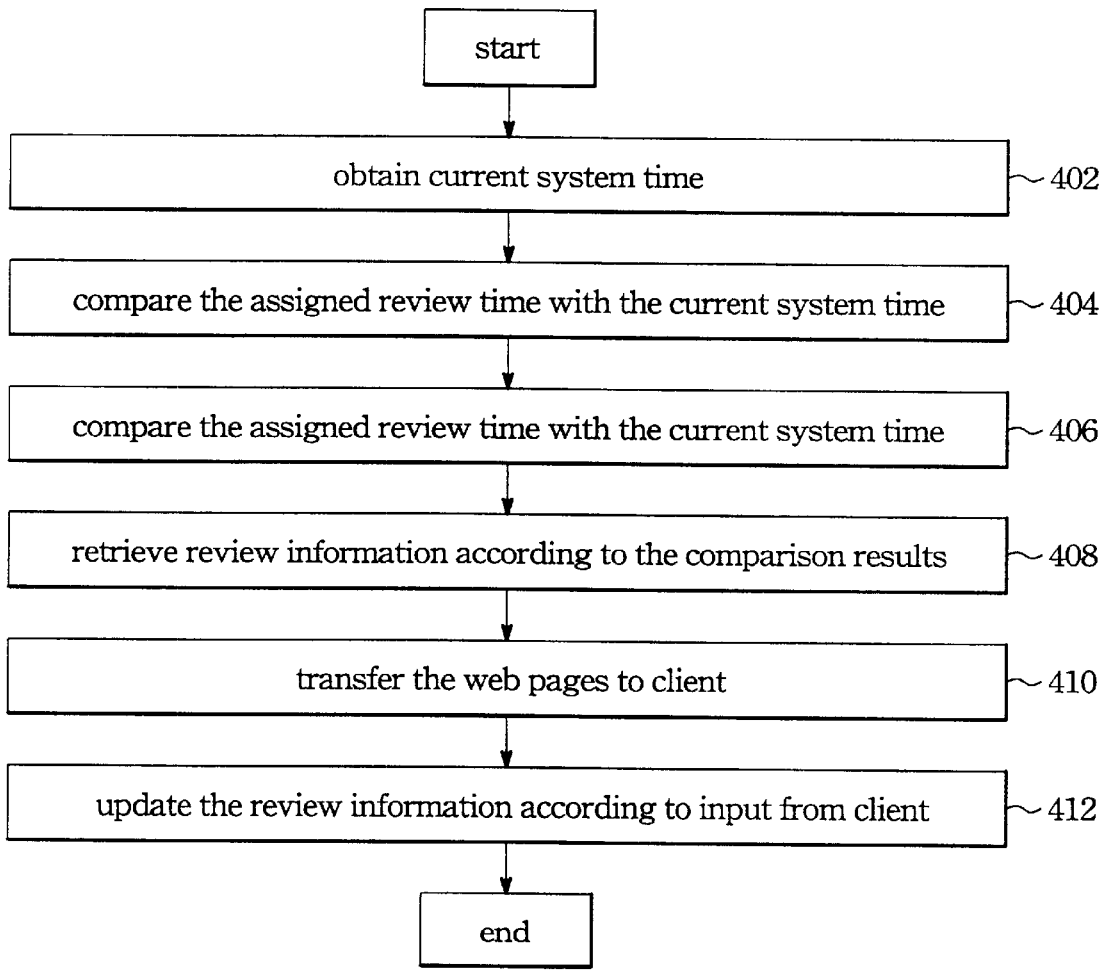
FIG. 4 is a flow diagram illustrative of the operating flow when customers define review information according to the invention.

FIG. 4 shows the operating flow of assigning reviewal information in block 206 of the embodiment. Firstly, server 12 accesses current system time (block 402) and compares with the review interval assigned via the review information assign module 308 (block 404). The disclosed system then fetches associated review information such as examination questions from the tutorial system database 122 by using the comparison results (block 406). Web pages derived from the fetched review information are then transferred from the server engine 123 through the communication link 14 to client 16A for showing purpose (block 408). Answers given by the customers in client 16A for the examination questions are transferred back to the server 12, which will result in the modifications of the customers' learning conditions (block 412).

As noted, an extremely short review interval, for example two days for reviewing once, may be assigned by customers. Therefore some review information may be out of date when the customers reenter the interactive tutorial system again after quite a long period such as a week under the anterior assignment. Under these cases, the disclosed system may ignore all "expired" review information or display a dialog box to notify customers that many expired review information has not been read yet and inquire the customers how to manipulate the expired review information. Of course, the disclosed system may show some message boxes to encourage customers have to review on time or to be diligent in learning, the skilled persons may modify the embodiment as applications.

Figure 7:
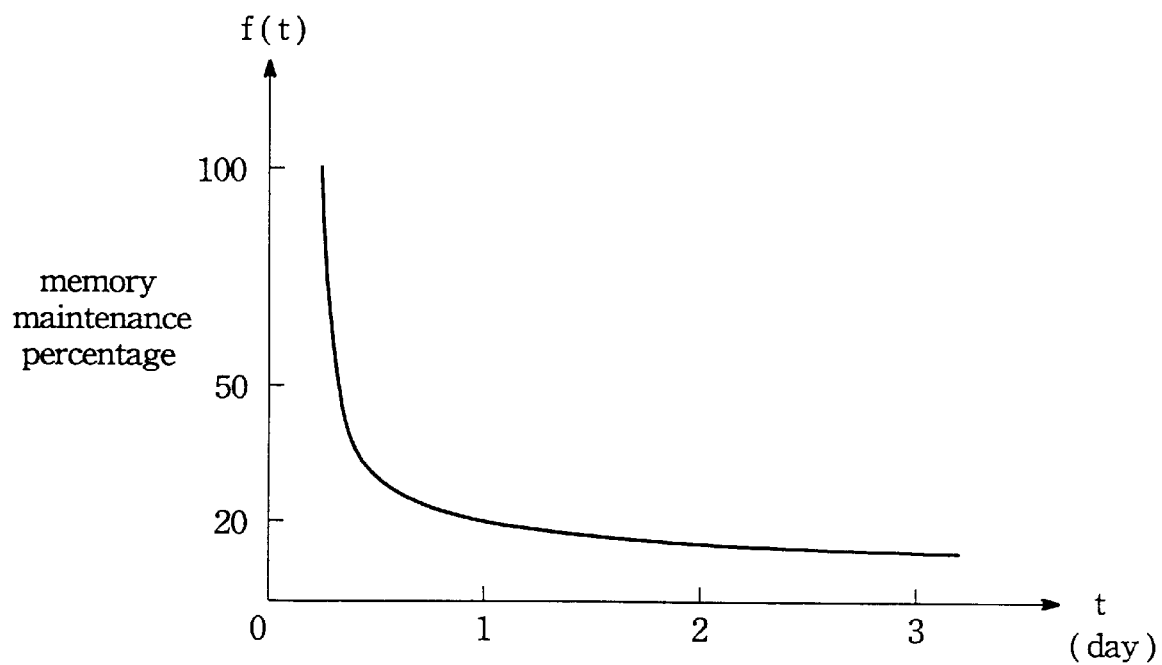
FIG. 7 is an exemplary diagram of a decay model illustrative of the human memory.
Figure 8:
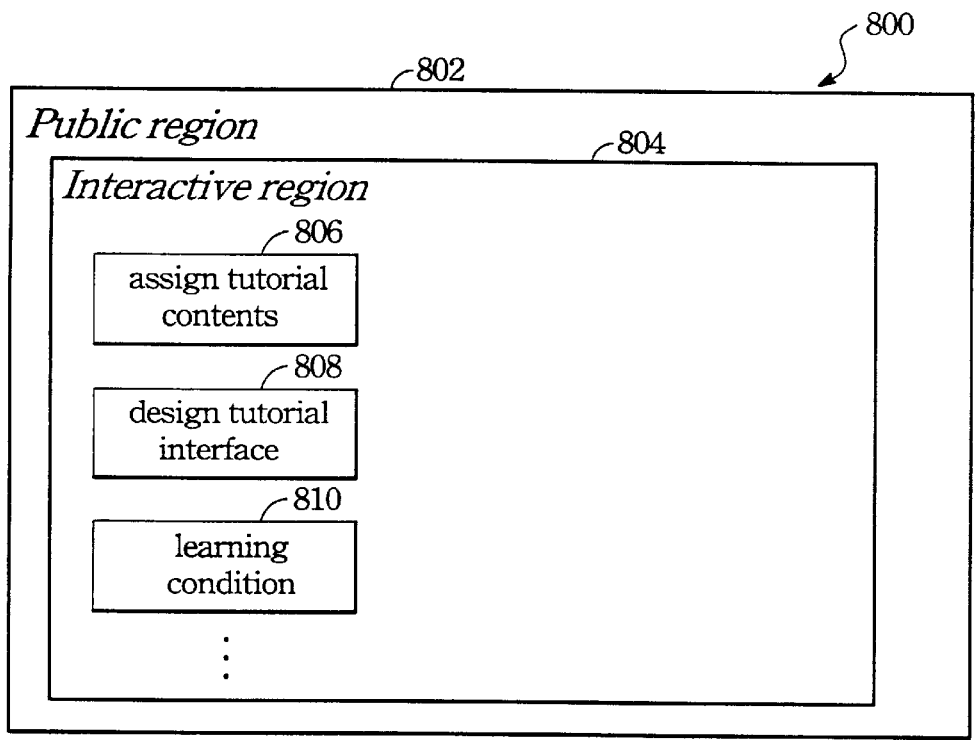
FIG. 8 is an exemplary web page illustrative of the operating interface provided by the teaching web server constructed according to the invention for defining and learning purpose.

In addition, the disclosed system may further employ a decay model such as the E. Hermann model illustrative of the human memory to select or generate examination questions in accompanied with individually practical learning conditions. As known from the curve in FIG. 7, the memory decay (f(t)) illustrated by the E. Hermann model has a tendency having a fast decaying rate initially and a slow decaying rate versus time (t), which indicates that the memory decay has the largest decaying rate at the first day of learning. Examination questions may therefore be selected and shown for customers based on the above model to upgrade learning efficiency. For example, a function $f(t)=kt$ can be employed to describe the practical learning condition wherein f, k, t respectively indicate memory maintenance percentage, reviewal weighted factor, and the time from the beginning of learning. The parameter k is a numerical parameter indicative of the actually condition of how the customers keep the courses in mind, which can be derived from the answers of the examination questions. The disclosed system may regulate the value of parameter k, such as "1.5", "1", and "0.5" to respectively indicate "excellent", "mediocre", and "worse". The system may select examination questions corresponding to the decay model in accompanied with parameter k for reviewal purpose. Those courses or examination styles will be repeatedly appear for reviewing through examination questions each time when customers enter the interactive tutorial system, therefore the learning efficiency may be significantly upgraded.

FIGS. 5, 6, 8, 9A, 9B, 9C, and 10 are consecutively employed for giving more detailed descriptions of the disclosed interactive tutorial system.

Figure 5:
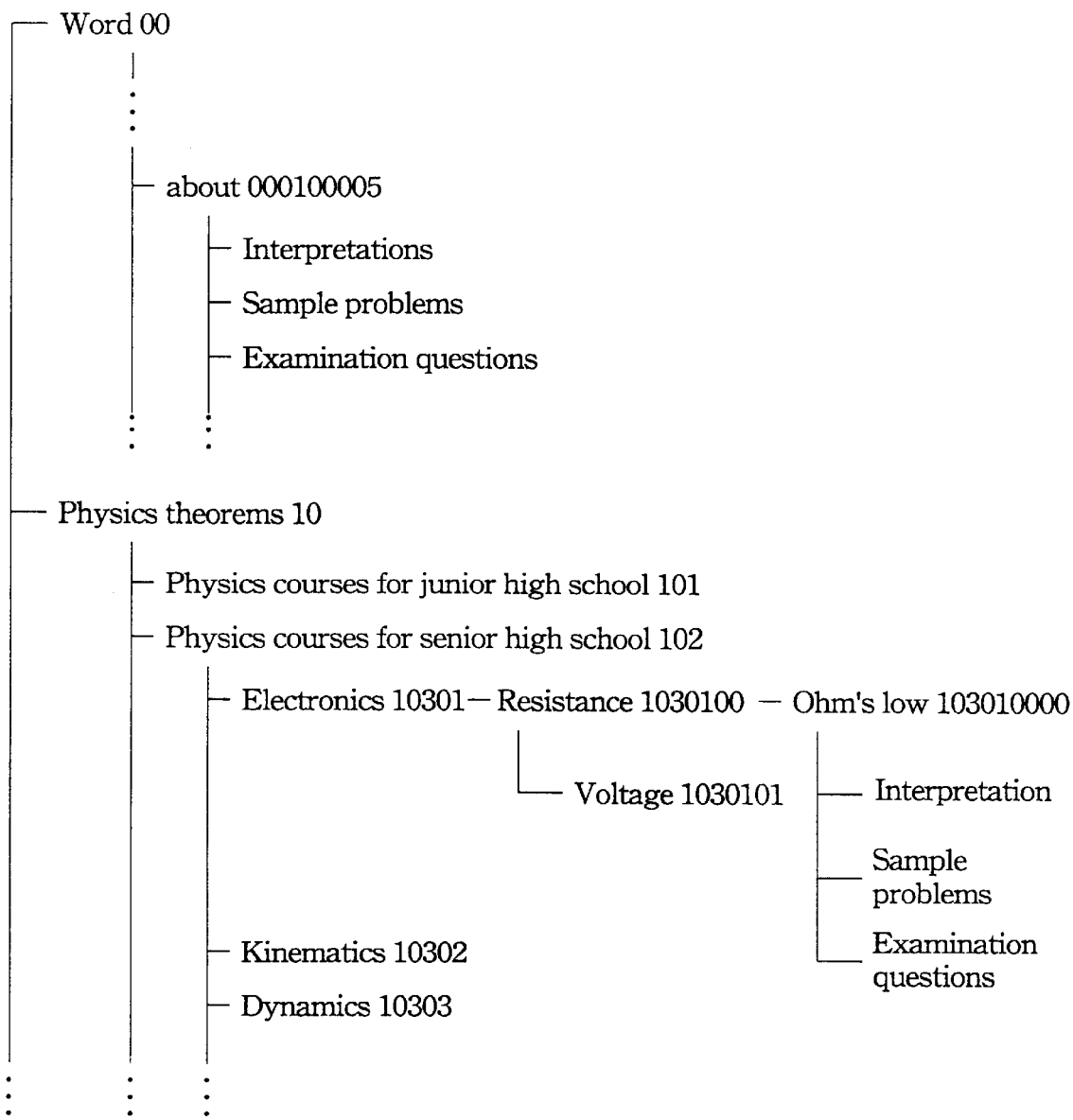
FIG. 5 is a schematic diagram of the course configuration of the invention.

Please now refer to FIG. 5, a schematic diagram for illustrating the detailed configuration of the tutorial system database 122 in FIG. 2 is shown therein. The course configuration shown in FIG. 5 basically encompasses two courses "Word"(course identification 00) and physics theorems" (course identification 10). The course "Word" further includes information concerned with the interpretations of the word "about", explanations for sample problems, and examination questions. Moreover, the course "Physics theorems" may be further divided into "Physics courses for junior high school" and "Physics courses for senior high school" wherein "Physics courses for senior high school" is further divided into "Electronics" (course identification 10301), "Kinematics" (course identification 10302), and "Dynamics"(course identification 10303). Furthermore, "Electronics" further encompasses "Resistance" (course identification 1030100) and "Voltage" (course identification 1030101). It is inevitable to refer to Ohm's law when "Resistance" is mentioned, therefore some explanations, sample problems, and examination questions associated with Ohm's law are cited when "Resistance" is referred. Please note that the examination questions may be stored in the tutorial system database 122, which may be modified as applications.

Figure 6:
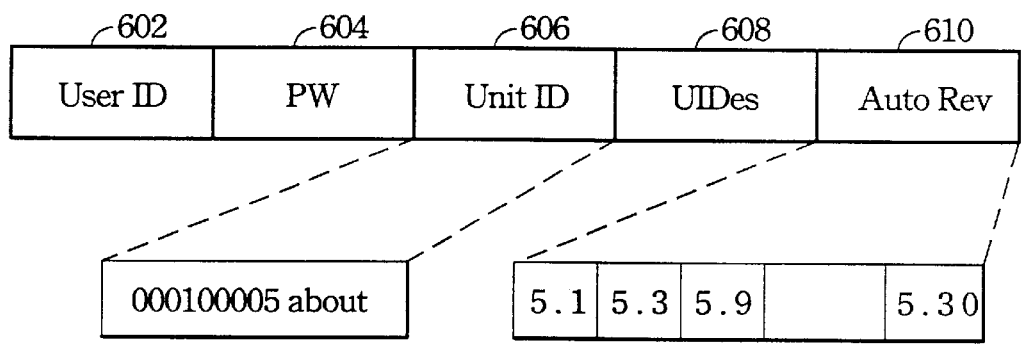
FIG. 6 is a schematic diagram illustrative of the data structure for storing individual customer data of the preferred embodiment.

Additionally, the disclosed system may employ the data structure in FIG. 6 to store the individual information of each member in the individual information database 121.

Basically, the data structure shown in FIG. 6 consists of five fields for storing customer identification (UserID) 602, password (PW) 604, data code of the course identification (UnitID) 606, data code for the designed tutorial interface (UIDes) 608, and data code concerned with auto reviewal (AutoRev) 610, respectively. The above customer identification 602 and password 604 are used to store customer's registry information, and the data code of the course identification 606 is used to store course identification assigned through the tutorial information assign module 306. Please note that the contents stored in FIG. 6 are the word "about" with course identification 00010005. The data code for the designed tutorial interface 608 stores the GUI information defined via the tutorial interface design module 304 (e.g., background color and employed fonts). The data code for auto reviewal 610 stores review time or interval via review information assign module 308, and the sequence "5.1", "5.3", "5.9", . . . "5.30" in FIG. 6 indicates the assigned review dates, for example, "5.1" indicative of the first of May. It is obvious that the server 12 can access the information stored in the above data structure and show the information in the designed user interface after customers enter the web server mounting the interactive tutorial system. As noted, any examination question concerned with the review interval will be shown for reviewal purpose. Additionally, the above data code of the course identification 606 may include more than one course identification to achieve the purpose of reviewing at least one course simultaneously.

The disclosed system may show the diagram indicative of the web page 800 for assigning or studying purpose after customers enter and register in the server 12. The web page 800 basically encompasses a public region 802 and an interactive region 804 wherein the public region 802 displays information associated with other web servers, for example, introductions, advertisements, or entrances for redirecting to another web sites. The interactive region 804 displays the tutorial interface designed by user, courses and in accompanied with contents (not shown), three buttons "assign tutorial contents" 806, "assign tutorial interface"808, and "learning conditions" 810. The buttons "assign tutorial contents" 806 and "assign tutorial interface"808 are entrances respectively for activating tutorial information assign module 306 and tutorial interface assign module 304. The "learning condition" button 810 may be used to display current learning condition or the learning trajectory for individual customers such as information concerned with the scores for all previous examination questions. Standard interfaces provided by computer operating systems for assigning background or foreground colors, or the types and sizes of the employed fonts may be applied in the disclosed system. No more description is given for the learning conditions because they may vary as applications. However, assign procedures of the tutorial course and information are described in the following paragraphs.

Figure 10:
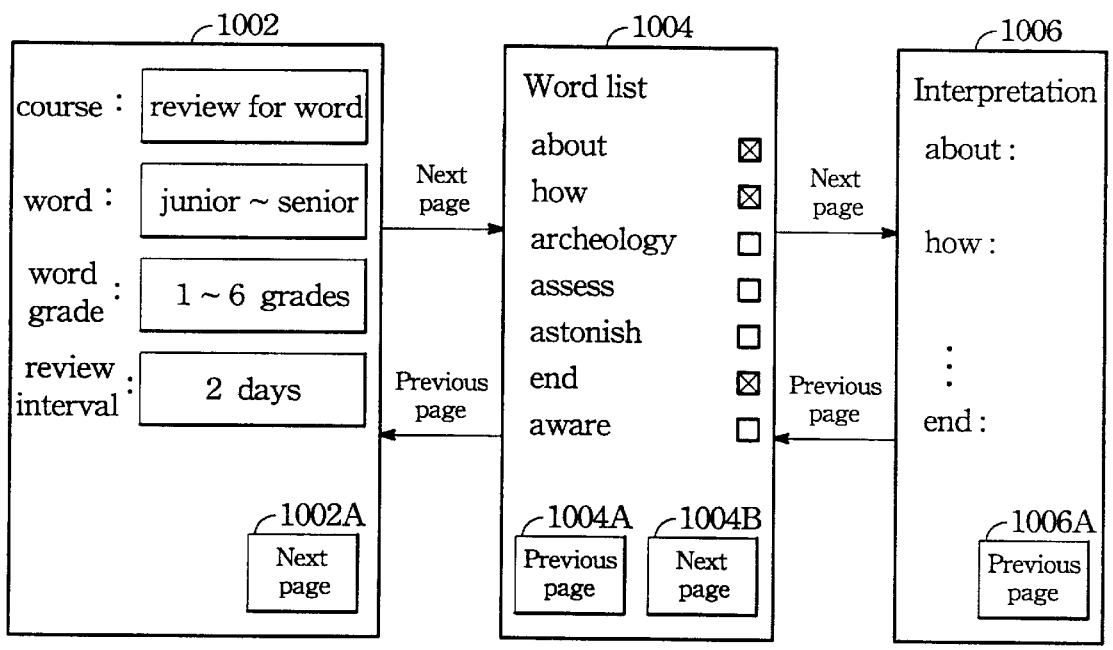
FIG. 10 is an exemplary web page for illustrating the course definition flow after entering the web server mounting the preferred embodiment of the invention.

FIG. 10 shows the schematic diagram indicative of the web page 1002 after customers press the "assign tutorial contents" 806 for assigning courses, wherein word, word grade of each member, and phrase grade are also shown in FIG. 10. Additionally, customers may press the button "Next page" 1002 to switch to the web page 1004 for selecting words used for tutorial from word lists. When the customers want to assign other courses for learning or to modify the web page 1002, they may press the button "previous page" 1004A to return to the web page 1002 for assigning. Moreover, customers may press the button "Next page" 1004B to go to the web page 1006 to look on the interpretations and explanations of the words or phrases assigned for tutorial purpose. Of course, customers may press the button "Previous page" 1006A in web page 1006 to go back to the web page 1004 for modifying predetermined assignments. As noted, the skilled persons may modify the above mentioned web pages, however, any modification within the spirit of the embodiment should be included in the appended claims.

Figure 9A:
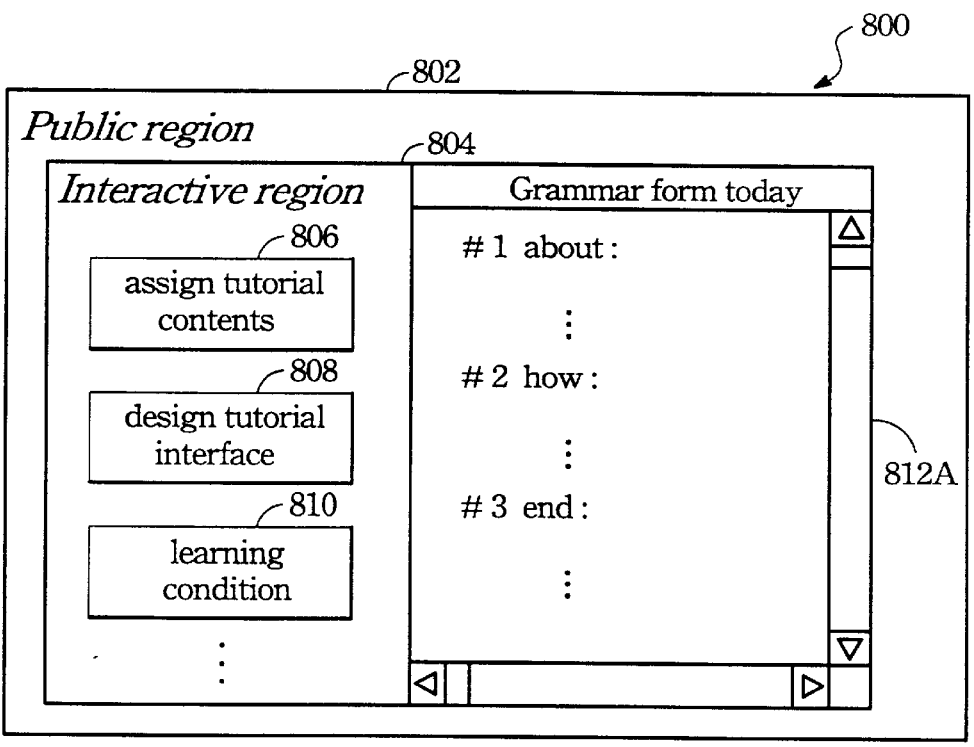
FIG. 9A is an exemplary web page that contains the tutorial information generated according to the users' previous definitions after entering the web server mounting the preferred embodiment of the invention.
Figure 9B:
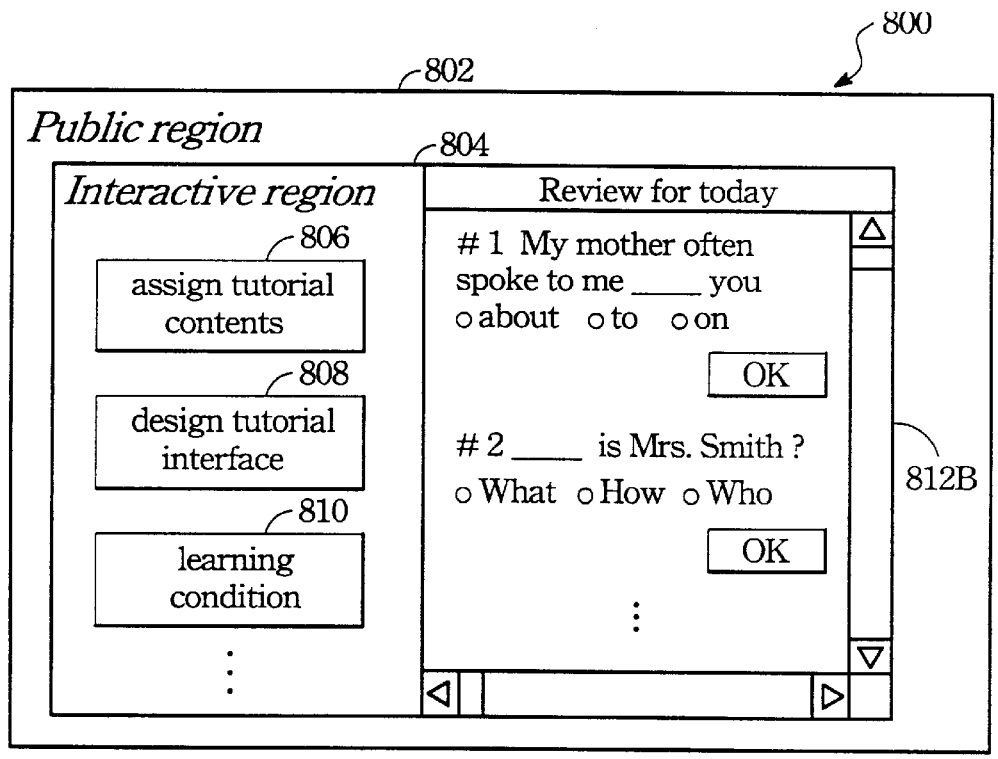
FIG. 9B is an exemplary web page for showing review information according to the users' previous definitions after entering the web server mounting the preferred embodiment of the invention.
Figure 9C:
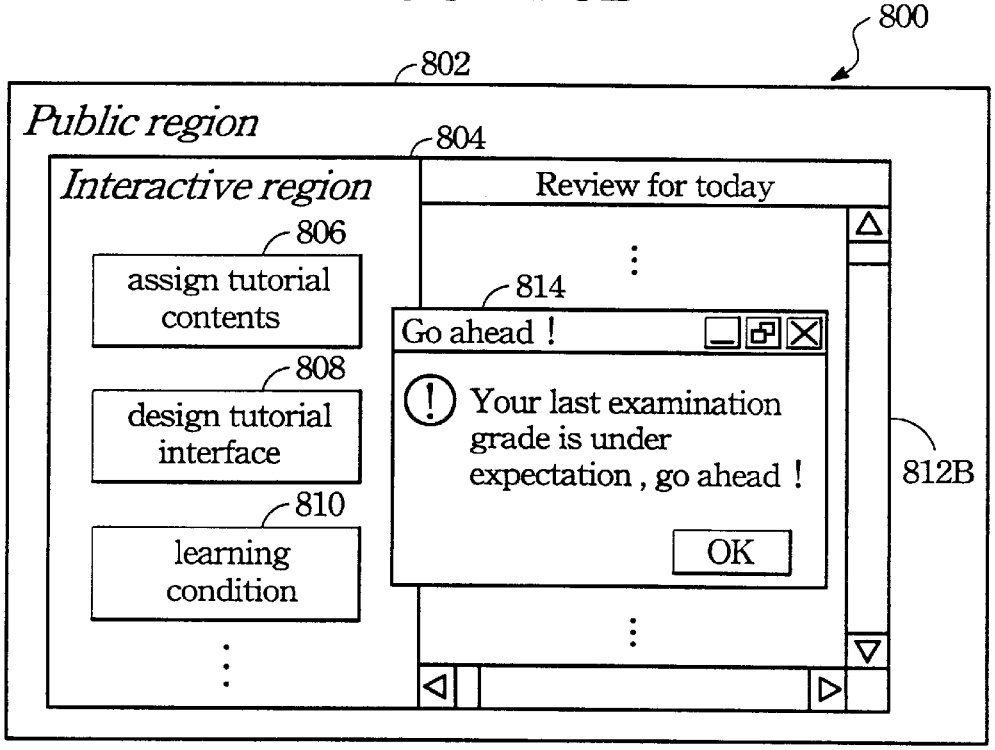
FIG. 9C is an exemplary web page for showing review information and in accordance with encouragement message according to the users' previous examination results of the preferred embodiment.

FIGS. 9A to 9C represent exemplary web pages indicative of when customer enters the server mounting the disclosed interactive tutorial system for learning. Please note that the web page in FIG. 8 may be employed when the customer first time enters the server mounting the disclosed system. Therefore the disclosed system will demonstrate the web page of FIG. 9A having a tutorial region 812A that encompasses word "about", "how", and "end" in the interactive region 804 after the customer comes to the server from now on. On the other hand, the disclosed will demonstrates the web page of FIG. 9B that includes examination questions in the review region 812B after the customer employs the disclosed system and it is time for review (once for two days as definition above). Answers of the examination questions will be stored and therefore result in the modification of the individual information of the individual database 121 mounted in the disclosed system. It is obvious for the disclosed system to demonstrate the web page of FIG. 9C that the tutorial region 812B should contain those examinations unfamiliar to the customer once again. Furthermore, a dialog box 814 is employed for showing some encouragement phrases (e.g., "Go ahead") to encourage the customer to make additional efforts on studying. Furthermore, all those examination questions being given wrong answers will be repeated represented for examination when the examination results are worse than expectation, which indicates that all those unfamiliar courses will be continually even periodically shown for upgrading tutorial efficiency. As noted, the exemplary web pages shown in FIGS. 9A to 9C may be modified as applications but all the modifications within the spirit of the embodiment should be included in the appended claims.

In conclusion, the present invention discloses an interactive tutorial system and method that can be mounted on the Internet to allows customers to design or assign the tutorial interfaces or courses as their wishes. The disclosed system can show examination questions generated currently associated with customers' individual learning conditions immediately so as to increase tutorial efficiency via the tutorial monitoring mechanism built in the Internet.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A server system for managing an interactive tutorial system having capability of permitting customers to design or assign tutorial interlaces and courses, wherein said server system comprises:

tutorial system database for storing customer information, course information, and review information for said interactive tutorial system, wherein said review information is generated according to a decay model illustrative of a human memory and according to a previous review result of said customer;

server storing means for storing programs of said server system; and processing means coupled with said server storing means for operating said programs to perform at least one operations of receiving commands, interpreting said commands, accessing said review information or said course information from said tutorial system database, generating web pages according to said review information or said course information, transferring said web pages to a client coupled with said server system for querying information from said interactive tutorial system.

2. The server system according to claim 1, wherein said server system couples with at least one of said client through a communication link for transferring said commands from said client to said server system, wherein said processing means operates said programs to perform operations of displaying operating interfaces in said client for assigning or designing said tutorial interfaces.

3. The server system according to claim 1, wherein said customer information comprises at least one course assign code indicative of at least one course provided by said course information according to a customer's requirements, wherein said designed course indicated by said course assign code is shown for said customer next time when said customer enters said interactive tutorial system.

4. The server system according to claim 1, wherein said customer information comprises at least one tutorial interface assign code indicative of tutorial interfaces designed according to a customer's requirements, wherein said assigned tutorial interfaces indicated by said tutorial interface assign code is shown for said customer next time when said customer enters said interactive tutorial system.

5. The server system according to claim 1, wherein said customer information comprises at least one review assign code indicative of portions of said review information according to a customer's requirements, wherein said assigned review information indicated by said review assign code is shown for said customer next time when said customer enters said interactive tutorial system.

6. The server system according to claim 5, wherein said review assign code comprises at least one review date.

7. The server system according to claim 1, wherein said review information is generated according to a decay model illustrative of a human memory and according to a previous review result of said customer.

8. The server system according to claim 1, wherein said customer information comprises at least one customer assign code indicative of contents of said course information or said review information.

9. The server system according to claim 1, further comprising a client system coupled with said server system comprising:

client storing means for storing programs;

processing means coupled with said client storing means for operating said programs to perform at least one operation of receiving commands, transferring said commands to said server system, receiving operating interfaces for designing individual tutorial interfaces, courses, or review information.

10. The server system according to claim 9, further comprising:

input means for receiving said commands from customers; and browsing means for displaying said tutorial interfaces, said operating interfaces, said courses, or said review information.

11. A method for permitting customers to design or assign tutorial interfaces and courses of an interactive tutorial system, said method comprising the steps of:

displaying course contents according to a course assign code assigned beforehand; and displaying review information according to a review assign code assigned beforehand.

12. The method according to claim 11, further comprising:

providing operating interfaces for assigning said course contents or said review information;

storing said course assign codes generated by using said course contents; and storing said review assign codes generated by using said review information.

13. The method according to claim 11, wherein said review information is generated by using a method comprising the steps of:

accessing current system time of said server system;

comparing an assigned review time included in said review information with said current system time to generate a comparison result;

accessing courses according to said comparison result; and displaying said accessed courses.

14. The method according to claim 11, wherein said review information is generated according to a decay model illustrative of a human memory.

15. The method according to claim 11, further comprising a method for designing tutorial interfaces of said interactive tutorial system comprising the steps of:

providing operating interfaces for designing at least one characteristic indicative of a background color, a foreground color, a font type, or a font size of said tutorial interfaces; and storing tutorial design codes generated according to said designed tutorial interfaces.

16. A computer-readable storage medium for storing a method for managing an interactive tutorial system capable of permitting customers to design or assign tutorial interlaces or courses, wherein said computer-readable storage medium comprises:

tutorial system module for storing individual customer information, course information, and review information of said interactive tutorial system, wherein said review information is generated according to a decay model illustrative of a human memory and according to a previous review result of a customer; and control code storing module for storing programs provided for operated by said interactive tutorial system to perform at least one operation of receiving commands, interpreting said commands, accessing said review information or said course information from said tutorial system database, generating web pages according to said review information or said course information, transferring said web pages.

17. The computer-readable storage medium according to claim 16, wherein said tutorial system module comprises an individual information module for storing said individual customer information at least comprising an identification, a password, or courses, tutorial interfaces, learning conditions, review interval designed by individual customers.

18. The computer-readable storage medium according to claim 16, wherein said individual customer information comprises a review assign code indicative of at least one review interval according to a customer's requirements, wherein said assigned review information indicated by said review assign code is shown for said customer next time when said customer enters said interactive tutorial system.

19. The computer-readable storage medium according to claim 16, wherein said review information is generated according to a decay model illustrative of a human memory and according to a previous review result of a customer.

20. The computer-readable storage medium according to claim 19, wherein said tutorial system module comprises at least one encouragement message being shown in accompanied with said review information.

21. A server system for managing an interactive tutorial system having capability of permitting customers to design or assign tutorial interfaces and courses, wherein said server system comprises:
   tutorial system database for storing customer information, course information, and review information for said interactive tutorial system;
   server storing means for storing programs of said server system; and
   processing means coupled with said server storing means for operating said programs to perform at least one operations of receiving commands, interpreting said commands, accessing said course information or said review information from said tutorial system database, generating web pages according to said review information or said course information, transferring said web pages to a client coupled with said server system for querying information from said interactive tutorial system.

22. The server system according to claim 21, wherein said server system couples with at least one of said client through a communication link for transferring said commands from said client to said server system, wherein said processing means operates said programs to perform operations of displaying operating interfaces in said client for assigning or designing said tutorial interfaces.

23. The server system according to claim 21, wherein said customer information comprises at least one course assign code indicative of at least one course provided by said course information according to a customer's requirements, wherein said designed course indicated by said course assign code is shown for said customer next time when said customer enters said interactive tutorial system.

24. The server system according to claim 21, wherein said customer information comprises at least one tutorial interface assign code indicative of tutorial interfaces designed according to a customer's requirements, wherein said assigned tutorial interfaces indicated by said tutorial interface assign code is shown for said customer next time when said customer enters said interactive tutorial system.

25. The server system according to claim 21, wherein said customer information comprises at least one review assign code indicative of portions of said review information according to a customer's requirements, wherein said assigned review information indicated by said review assign code is shown for said customer next time when said customer enters said interactive tutorial system.

26. The server system according to claim 25, wherein said review assign code comprises at least one review date.

27. The server system according to claim 21, wherein said review information is generated according to a decay model illustrative of a human memory and according to a previous review result of said customer.

28. The server system according to claim 21, wherein said customer information comprises at least one customer assign code indicative of contents of said course information or said review information.

29. The server system according to claim 21, further comprising a client system coupled with said server system comprising:
   client storing means for storing programs;
   processing means coupled with said client storing means for operating said programs to perform at least one operation of receiving commands, transferring said commands to said server system, receiving operating interfaces for designing individual tutorial interfaces, courses, or review information.

30. The server system according to claim 29, further comprising:
   input means for receiving said commands from customers; and
   browsing means for displaying said tutorial interfaces, said operating interfaces, said courses, or said review information.

* * * * *